United States Patent [19]

Kudo et al.

[11] Patent Number: 5,576,369
[45] Date of Patent: Nov. 19, 1996

[54] FRICTION MATERIAL

[75] Inventors: Takashi Kudo; Osamu Nakajima, both of Saitama, Japan

[73] Assignee: Akebono Brake Industry Co., Ltd., Tokyo, Japan

[21] Appl. No.: 255,870

[22] Filed: Jun. 8, 1994

[30] Foreign Application Priority Data

Jun. 8, 1993 [JP] Japan ................................. 5-137904

[51] Int. Cl.⁶ ............................. C08J 5/14; C08K 3/10; C08L 101/12
[52] U.S. Cl. ........................ 524/413; 523/149; 524/430; 524/431
[58] Field of Search ........................... 523/149; 524/413, 524/430, 431

[56] References Cited

U.S. PATENT DOCUMENTS

| | | | |
|---|---|---|---|
| 3,684,062 | 8/1972 | Johnson | 188/251 R |
| 3,967,047 | 6/1976 | Marzocchi et al. | 428/392 |
| 4,226,759 | 10/1980 | Chester | 260/38 |
| 4,273,369 | 6/1981 | Rosenbaum | 293/1 |
| 4,446,203 | 5/1984 | Okubo et al. | 428/283 |
| 4,944,373 | 7/1990 | Ohya et al. | 188/251 A |
| 5,344,854 | 9/1994 | Ohya et al. | 523/149 |

FOREIGN PATENT DOCUMENTS

| | | |
|---|---|---|
| 0129022 | 12/1984 | European Pat. Off. . |
| 2535526 | 10/1977 | Germany . |

*Primary Examiner*—Paul R. Michl
*Assistant Examiner*—Patrick Niland
*Attorney, Agent, or Firm*—Finnegan, Henderson, Farabow, Garrett & Dunner, L.L.P.

[57] ABSTRACT

A friction material is prepared by mixing copper oxide particles as a friction modifier into a friction material composed of reinforcing fibers, particularly, metal fibers such as copper fibers or the like, a bonding material, and a friction modifier.

5 Claims, 1 Drawing Sheet

FRICTION MATERIAL

BACKGROUND OF THE INVENTION

The present invention relates to a friction material for brakes or clutches for use in automobiles, railroad vehicles, industrial machines, and so on.

Generally, as shown in U.S. Pat. No. 4,226,759, U.S. Pat. No. 4,273,369 and so on, a friction material (brake pad, brake lining, clutch facing or the like) for brakes or clutches is composed of reinforcing fibers such as organic fibers, inorganic fibers, metal fibers, etc.; a bonding material of thermosetting resin such as phenolic resin or the like; a friction modifier such as metal particles, ceramic particles, rubber particles, cashew dust or the like; and additonal elements such as a solid lubricant and a filler. In most cases, conventionally, metal fibers such as copper fibers or the like and metal particles such as copper particles or the like have been used in combination as the reinforcing fibers and the friction modifier in order to have a sufficient friction coefficient and stable friction performance to the friction material. In the case of using such metal fibers and metal particles, however, there is a tendency of generating noises of low frequency while the friction coefficient and the friction performance are improved.

SUMMARY OF THE INVENTION

The present invention has been attained in view of the foregoing circumstances, and an object of the present invention is to prevent generation of noises of low frequency in a friction material containing metal fibers or metal particles while ensuring a sufficient friction coefficient and friction stability.

In order to solve the foregoing object, the present invention provides the following configuration.

That is, the friction material according to the present invention is characterized in that it contains copper oxide particles as a friction modifier.

The present invention will be described below in detail.

The friction material according to the present invention is obtained in such a manner that in a conventionally used friction material composed of reinforcing fibers, a bonding material, a friction modifier, and additional elements such as a solid lubricant and a filler, copper oxide particles are mixed as the friction modifier and this mixture composition is formed into a desired shape through an ordinary method.

Examples of the reinforcing fibers used herein include organic fibers such as aramid fibers (an example available in the market is, for example, KEVLAR, trade name, made by Du Pont de Nemours & Co.), acrylic fibers, and so on; inorganic fibers such as ceramic fibers (for example, alumina fibers, glass fibers, and so on), rock wool, carbon fibers, and so on; and metal fibers such as steel fibers, copper fibers, brass fibers, and so on. One kind of these organic, inorganic and metal fibers or the mixture of two or more kinds thereof are used as the reinforcing fibers. It is preferable to select the quantity of use of those reinforcing fibers to be in a range of from 1 to 10% by weight in the case of organic fibers, from 0 to 30% by weight in the case of inorganic fibers, and from 1 to 20% by weight in the case of metal fibers, with respect to the whole mixture quantity of the friction material.

As the bonding material, thermosetting resin such as phenolic resin or the like may be used. Preferably, the quantity of use of the bonding material is selected to be in a range of from 5 to 15% by weight with respect to the whole mixture quantity of the friction material.

As the friction modifier, it is possible to use metal particles such as copper particles, brass particles, zinc particles, aluminum particles and so on; ceramic particles (such as alumina particles, silica particles and so on); and organic dust such as rubber particles, resin dust (such as cashew dust) and so on. It is preferable to select the quantity of use of such a friction modifier to be in a range of from 1 to 10% by weight in the case of metal particles, from 0 to 10% by weight in the case of ceramic particles, from 0 to 20% by weight in the case of organic dust, (from 0 to 10% by weight in the case of each of rubber particles and resin dust), with respect to the whole mixture quantity of the friction material.

As the solid lubricant, graphite, molybdenum dioxide and so on may be used. It is preferable to select the quantity of use of the solid lubricant to be in a range of from 1 to 10% by weight.

As the filler, barium sulfate, calcium carbonate, magnesium oxide and so on may be used. It is suitable to select the quantity of use of the filler to be in a range of from 5 to 40% by weight.

According to the present invention, into a friction material composed of such mixture components, copper oxide particles are mixed as the friction modifier by 0.5 to 20% with respect to the whole mixture quantity of the friction material. This copper oxide particles may be particles of copper (II) oxide CuO or particles of copper (I) oxide $Cu_2O$ After such mixture components are mixed, agitated and preformed, this preformed subject is heat-formed by a hot press in which a pressure plate is set beforehand, so as to be finished into a formed product of predetermined thickness and density. Next this formed product is subject to heat treatment, and further shaped so as to obtain a friction material of the present invention. In this case, the preforming is performed at the surface pressure in a range of from 100 to 500 $Kgf/cm^2$. The heat forming is performed for about 3 to 15 minutes at the temperature in a range of from 130° to 180° C. and the surface pressure in a range of from 200 to 1,000 $Kgf/cm^2$. The heat treatment is performed for about 1 to 15 hours at the temperature 150° to 300° C.

DESCRIPTION OF THE PREFERRED EMBODIMENTS

Figure 1:
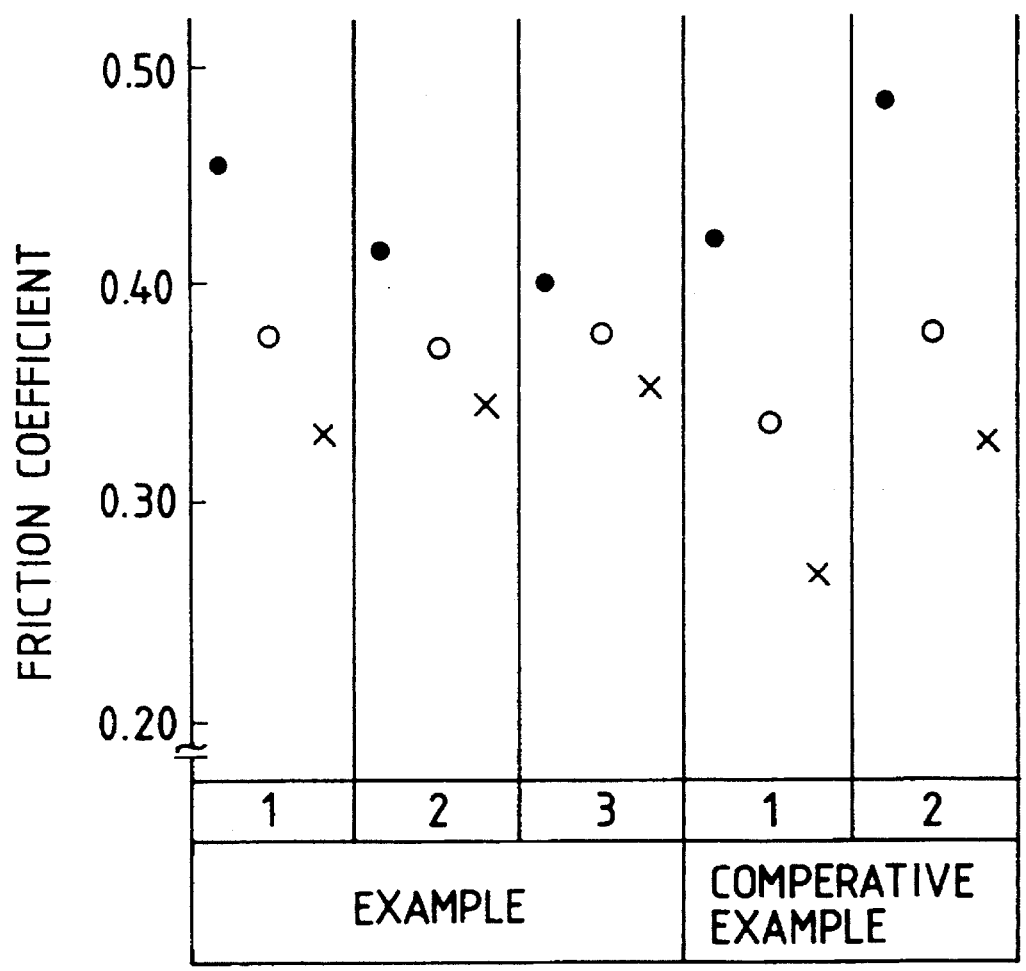
FIG. 1 shows changes in friction coefficient depending on the brake speed with respect to the respective friction materials prepared in Examples and Comparative Examples.

The present invention will be described in the form of examples.

EXAMPLE 1–3, COMPARATIVE EXAMPLE 1–2

Mixture components shown in Table 1 were mixed and agitated sufficiently. After this mixture was preformed into the shape of a brake pad at the surface pressure 200 $Kgf/cm^2$, this preformed subject was put onto a hot press in which a pressure plate was set beforehand, and heat-formed for 10 minutes at the temperature 155° C. and the surface pressure 500 $Kgf/cm^2$. Next this formed product was subject to heat treatment for 10 hours at 200° C., and further shaped into a brake pad integrated with a pressure plate.

In the mixture components of Examples 1 to 3, the percentage of the sum of copper (II) oxide particles and copper fiber was selected to be 18% (by weight), while the respective percentages of these materials were changed. In the mixture components of Comparative Example 1, copper (I) oxide particles were not used in the mixture components of Example 2, while barium sulfate was increased so much to 37%. In the mixture components of Comparative Example 2, copper (II) oxide was not used in the mixture components of each Example, while copper fibers were increased so much to 18%.

TABLE 1

| | (% is by weight) | | | | |
|---|---|---|---|---|---|
| | Example | | | Comparative Example | |
| | 1 | 2 | 3 | 1 | 2 |
| copper (II) oxide particles (CuO) | 1 | 7 | 15 | — | — |
| aramid fibers | 5 | 5 | 5 | 5 | 5 |
| copper fibers | 17 | 11 | 3 | 11 | 18 |
| ceramic fibers | 15 | 15 | 15 | 15 | 15 |
| graphite | 10 | 10 | 10 | 10 | 10 |
| barium sulfate | 30 | 30 | 30 | 37 | 30 |
| copper particles | 2 | 2 | 2 | 2 | 2 |
| rubber particles | 5 | 5 | 5 | 5 | 5 |
| cashew dust | 5 | 5 | 5 | 5 | 5 |
| phenolic resin | 10 | 10 | 10 | 10 | 10 |
| total | 100 | 100 | 100 | 100 | 100 |

Next, upon each brake pad, the measurement of the friction coefficient ($\mu$) and the noise test was performed according to the following test method so as to estimate the performance.

Test Method (1) Measurement of Friction Coefficient
Test Piece
  Thickness of pressure plate: 5 mm
  Thickness of test piece: 10 mm
  Area of friction surface: 45 cm$^2$
Test Method
According to the test method prescribed in JASO test code C406-82, full size dynamometer was used and the friction coefficient was measured under the conditions that: (using a cast iron disc rotor); initial brake speed of 20, 50 and 100 Km/hr; brake temperature of 95° C.; and deceleration of 0.6 G.
Result of Test
FIG. 1 shows the result of the test (in the drawing, ● indicates the speed of 20 Km/hr, o the speed of 50 Km/hr, and × the speed of 100 Km/hr). As is apparent from this drawing, while the change of the friction coefficient $\mu$ was 14 to 39% in the respective speeds from the lower one to the higher one according to the brake pads of Examples 1 to 3, the change of the friction coefficient $\mu$ was larger, 50 to 56%, in the case of the brake pads of Comparative Example 1 and 2. Particularly in the case of Comparative Example 1 where copper fibers were contained by the quantity identical with that of Example 2, and copper oxide particles were not used, the friction coefficient $\mu$ is extremely decreased at a high speed range.

(2) Noise Test
Test Piece
  Thickness of pressure plate: 5.5 mm
  Thickness of friction material: 10 mm
  Area of friction surface: 45 cm$^2$
Test Method
By use of a test vehicle, under the conditions of initial brake speed of 40 Km/hr; brake (the material of a disc rotor was the same as that in the case of the friction coefficient test) temperature 60° C., 90° C., and 150° C.; and deceleration of 0.4 G, noise (low frequency sounds) were estimated sensually by three-step estimation.
Result of Test
Table 2 shows the result of the noise test.

TABLE 2

| | | Example | | | Comparative Example | |
|---|---|---|---|---|---|---|
| | | 1 | 2 | 3 | 1 | 2 |
| Brake temperature | 60° C. | □ | o | o | □ | x |
| | 90° C. | □ | o | o | x | x |
| | 150° C. | □ | □ | o | x | x |

NOTES:
o indicates no generation of noise; □ indicates generation of noise which are permissibly slight; and x indicates generation of noise in an intolerably large quantity.

According to the present invention, copper oxide particles are mixed into a conventional friction material containing metal fibers and metal particles, so that it is possible to improve the characteristic of noise over a temperature range of from low temperature to high temperature while ensuring a sufficient friction coefficient and friction stability over a range of from low speed to high speed.

What is claimed is:

1. A friction material comprising:
  metal reinforcing fibers, a bonding material, a friction modifier, and fillers, characterized in that said friction material contains copper oxide particles as said friction modifier; and
  said copper oxide particles being present in a range of from 0.5 to 20% by weight relative to the total amount of said friction material to prevent low frequency noise.

2. A friction material according to claim 1, characterized in that said copper oxide particles are copper (I) oxide.

3. A friction material according to claim 1, characterized in that said copper oxide particles are copper (II) oxide.

4. A friction material according to claim 1, wherein said metal reinforcing fibers are present in amount of 1%–20% by weight relative to the whole mixture quantity of said friction material.

5. A friction material according to claim 1, having less than a 40% difference between its friction coefficient at a speed of 20 km/hr and a friction coefficient at a speed of 100 km/hr.

* * * * *